June 5, 1923.
R. B. OLDER
1,457,792
ELECTRICALLY HEATED FLATIRON
Filed April 14, 1921
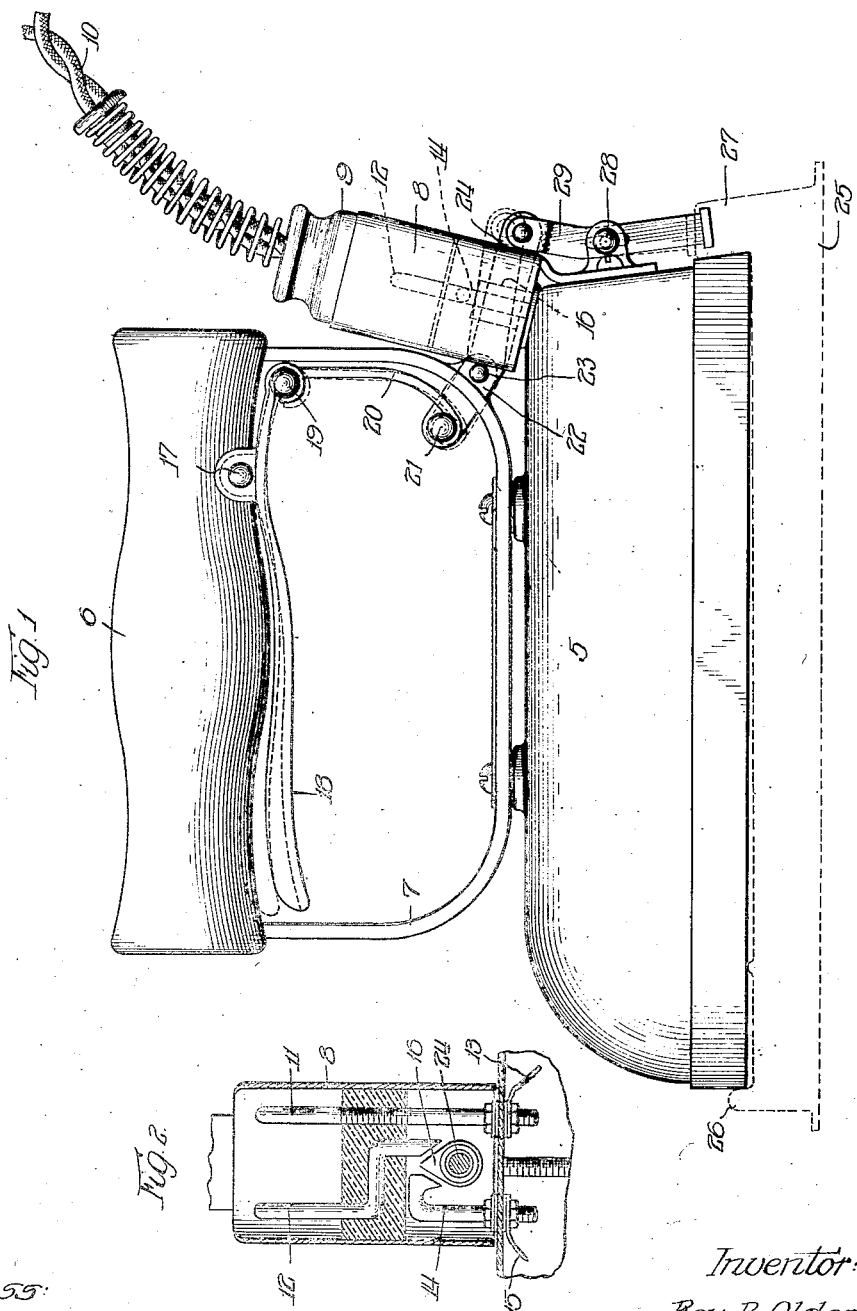
Witness:
R. Burkhardt
Inventor:
Roy B. Older,
by Spindle, Hopkins & McNair
Attys.

Patented June 5, 1923.

1,457,792

UNITED STATES PATENT OFFICE.

ROY BURTON OLDER, OF DANVILLE, ILLINOIS.

ELECTRICALLY-HEATED FLATIRON.

Application filed April 14, 1921. Serial No. 461,276.

*To all whom it may concern:*

Be it known that I, ROY B. OLDER, a citizen of the United States, residing at Danville, in the county of Vermilion and State of Illinois, have invented certain new and useful Improvements in Electrically-Heated Flatirons, of which the following is a specification.

My invention relates to an electric flat iron, and has particular reference to a switch for use therewith, which, in normal position, cuts off the supply of current to the heating element of the iron.

An object of my invention is to provide an electric flat iron with a switch which is normally in opened position.

Another object of my invention is to provide an electric flat iron with a switch adapted to be manipulated by the ironer and which is closed only under abnormal conditions.

A further object of my invention is to provide an electric flat iron with a switch which is normally open, but which may be closed under certain conditions for heating the iron.

Generally speaking, I carry out the preferred embodiment of my invention by providing a switch on an electric flat iron which is normally opened and which has a handle adjacent the handle of the flat iron positioned so as to be easily grasped by the operator and held in closed position while ironing. Other means are provided for heating the iron under certain conditions.

The various novel features of my invention will be apparent from the following specification and drawings, and will be particularly pointed out in the appended claims.
In the drawings:

Fig. 1 is a side elevation of a flat iron provided with the preferred embodiment of my invention, and showing, in dotted lines, a stand for the iron.
Fig. 2 is an enlarged vertical section through the switch of my invention.

I have shown an electric flat iron 5 of uniform form and shape, having a handle 6 connected thereto by a bail member 7 in the usual manner. Within the body 5 of the iron is the heating element (not shown), which may be of any well known form.

Mounted at the rear of the handle 6 is a receptacle or casing 8 adapted to receive a plug 9 of the usual kind, which is fastened at the end of electrical conductors or wires 10, the other ends of which may be connected in the usual manner to a source of electricity. The switch comprises contact members 11 and 12, which are adapted for electrical connection with the plug 9 when the same is inserted in the casing 8. To one end of the contact member 11 a wire 13 is connected to one portion of the heating element (not shown). A third contact 14 is mounted in the lower end of the casing 8 and is connected by means of a wire 15 with the other end of the heating element (not shown). For establishing electric connection between the contacts 12 and 14, a movable contact member 16 is provided, which, under normal conditions, is in open position, that is, out of contact with the members 12 and 14, so that no current may flow therebetween. Pivoted in unbalanced position at 17 to the handle 6 is a lever 18 which is substantially co-extensive with the handle 6 and curved in section to conform to the shape thereof. Connected by means of a pin 19 to the other end of the lever 18 is a link 20 which is connected by means of a pin 21 to one arm 22 of a lever which is pivoted at 23 to the bail 7 of the handle. Another arm 24 extends through the casing 8 and carries the movable contact 16. It may readily be seen, therefore, that as the lever 18 is pressed against the handle 6 of the iron, which it will be whenever the handle is grasped, the arm 24 is rocked and the movable contact 16 caused to move upwardly and establish a contact between the members 12 and 14 so that the electric circuit through the heating element is then closed, whereupon the same may become heated. As soon as the operator releases the handle 6 of the iron, the lever 18 will be dropped by reason of its unbalanced connection, causing dropping of the movable contact 16, and breaking the circuit to the heating element.

With the circuit to the heating element normally opened, it would be inconvenient for an operator to have to hold the lever 18 against the handle 6 of the iron until the iron were sufficiently hot for purposes of use. To heat the iron, therefore, I provide a standard or base 25 having a projection 26 at the front end thereof against which the front end of the iron 5 rests, and with an upstanding rear ledge 27. Carried on a pin 28 on the iron 5 is a slotted lever 29 connected at one end to the arm 24, carrying the movable contact 16 of the switch and having its lower end adapted to rest against the top of the ledge 27 when the iron is in the position shown in the drawings. When in this position the slotted link 29 will be moved upwardly, rocking the arm 24 and closing the contact 16 to establish electric connection between the members 12 and 14, whereby electric current may flow to the heating element of the iron for heating the same. When in this position the parts will be such as are shown in dotted lines in Fig. 1. When the iron has been sufficiently heated, the operator may then use it for ironing purposes. To prevent the iron from becoming too hot, it may be raised so that the rear end will rest in the ledge 27, whereupon the circuit through the members 12 and 14 will be opened by reason of the falling of the arms and the contact 16.

It may be observed that my invention permits the heating of an electric iron which is controlled entirely by the operator, and that, until the iron is put on the stand in the manner shown in the drawings, there is no possibility of heating the iron in the absence of the operator, even though the current is turned on, for unless the iron is in the position shown in the drawings, that is, with the link 29 resting on the ledge 27 of rest 25, or unless the lever 18 is pressed against the handle of the iron by the operator, it is impossible for current to flow to the heating element, an advantage which is readily apparent.

While I have described more or less precisely the details of construction of my invention, I do not wish to be understood as limiting myself thereto, as I contemplate changes in form and the proportion of parts and the substitution of equivalents, as circumstances may suggest or render expedient, without departing from the spirit or scope of my invention.

I claim:

1. In an electrically heated flat iron and a stand therefor, in combination, a single switch in the circuit to the heating element maintained normally in open position, means on said iron for closing said switch and means co-operating with the iron stand for closing said switch to heat the iron under certain conditions.

2. An electrically heated flat iron and a stand therefor, said iron having, in combination, a switch on the iron in the circuit to the heating element which switch is normally in open position, and means operable by the iron stand for closing said switch under certain conditions.

3. In an electrically heated flat iron, in combination, a switch mounted thereon in circuit with the heating element, and means for actuating the switch, said means including a lever pivoted to the handle of the iron, a rocker arm carrying a movable contact for closing said switch, and a link connecting said lever and said arm for actuating the latter.

4. In an electrically heated flat iron, having a switch thereon in circuit with the heating element thereof, a movable member in said switch for closing the circuit in said element, and an arm projecting outwardly of said switch for moving said member into circuit closing position.

5. In an electrically heated flat iron, having a switch thereon in circuit with the heating element thereof, a movable member in said switch for closing the circuit to said element, a rocker arm carrying said member, an unbalanced lever pivoted on the handle of said iron, and a link connecting said lever and said arm for actuating the switch.

6. In an electrically heated flat iron, having a switch thereon in circuit with the heating element thereof, a movable member in said switch for closing the circuit to said switch, a rocker arm carrying said member, and a link supported on the iron adapted for engagement by a projection for actuating the switch to heat the iron.

7. An electrically heated flat iron and a stand therefor, in combination, a switch on the iron in the circuit to the heating element thereof normally in open position, and means carried wholly by the iron for closing said switch for heating the iron while in use and while on said stand.

8. An electrically heated flat iron and a stand therefor, said iron having a switch thereon in circuit with the heating element thereof, a plurality of switch actuating members carried by the iron, one operable by the operator and another operable by the iron stand for closing the switch under certain conditions.

9. An electrically heated flat iron and a stand therefor, a normally open switch on said iron controlling the circuit to the heating element thereof, two switch operating members on the iron, one adjacent the handle of the iron adapted to be grasped by the operator to close the switch for ironing, and the other adjacent the rear end of the iron adapted to engage a projection on the stand closing the switch to heat said iron while the same is on said stand.

10. An electrically heated flat iron and a stand therefor, said stand having an upstanding ledge, a switch on said iron in circuit with the heating element thereof which switch includes a movable member for closing and opening the circuit therethrough, said member being maintaned by gravity in open position, a lever pivoted on the handle of the iron in position to be grasped by the operator, connections between said lever and the movable member of the switch whereby the latter may be moved into circuit closing position when the lever is grasped, a link on said iron adapted to engage the stand ledge, and connections between said link and said switch member whereby the latter may be moved into circuit closing position when said link engages said ledge.

Signed at Danville, Illinois, this 7th day of April, 1921.

ROY BURTON OLDER.